United States Patent [19]
Lee, Jr.

[11] 3,848,221
[45] Nov. 12, 1974

[54] CONTACT ASSEMBLY UTILIZING FLEXIBLE CONTACTS FOR PINS OF INTEGRATED CIRCUITS

[75] Inventor: Robert E. Lee, Jr., Mountain View, Calif.

[73] Assignee: International Production Technology Corporation, Sunnnyvale, Calif.

[22] Filed: Mar. 7, 1973

[21] Appl. No.: 338,966

[52] U.S. Cl. ...... 339/74 R, 324/158 F, 339/178 MP
[51] Int. Cl. ............................................ H01r 13/62
[58] Field of Search ........... 339/17, 18, 74, 75, 176; 324/158 F, 158 P

[56] References Cited
UNITED STATES PATENTS

| | | | |
|---|---|---|---|
| 3,537,063 | 10/1970 | Beaulieu | 339/74 R |
| 3,568,134 | 3/1971 | Anhalt et al. | 339/75 MP |
| 3,611,259 | 10/1971 | Palecek | 339/74 R |
| 3,719,860 | 3/1973 | Lawrence | 339/17 CF |
| 3,744,005 | 7/1973 | Sitzler | 339/75 MP |
| 3,764,955 | 10/1973 | Ward | 339/176 MP |
| 3,793,609 | 2/1974 | McIver | 339/74 R |

FOREIGN PATENTS OR APPLICATIONS

| | | | |
|---|---|---|---|
| 1,231,107 | 5/1971 | Great Britain | 324/158 P |

*Primary Examiner*—Joseph H. McGlynn
*Attorney, Agent, or Firm*—Limbach, Limbach & Sutton

[57] ABSTRACT

A contact assembly for use in testing integrated circuits having pins extending outward from an integrated circuit package, wherein flexible contacts are cammed into and out of electrical contact with the integrated circuit pins as a large number of integrated circuits are tested or are moved into testing position one at a time.

9 Claims, 9 Drawing Figures

3,848,221

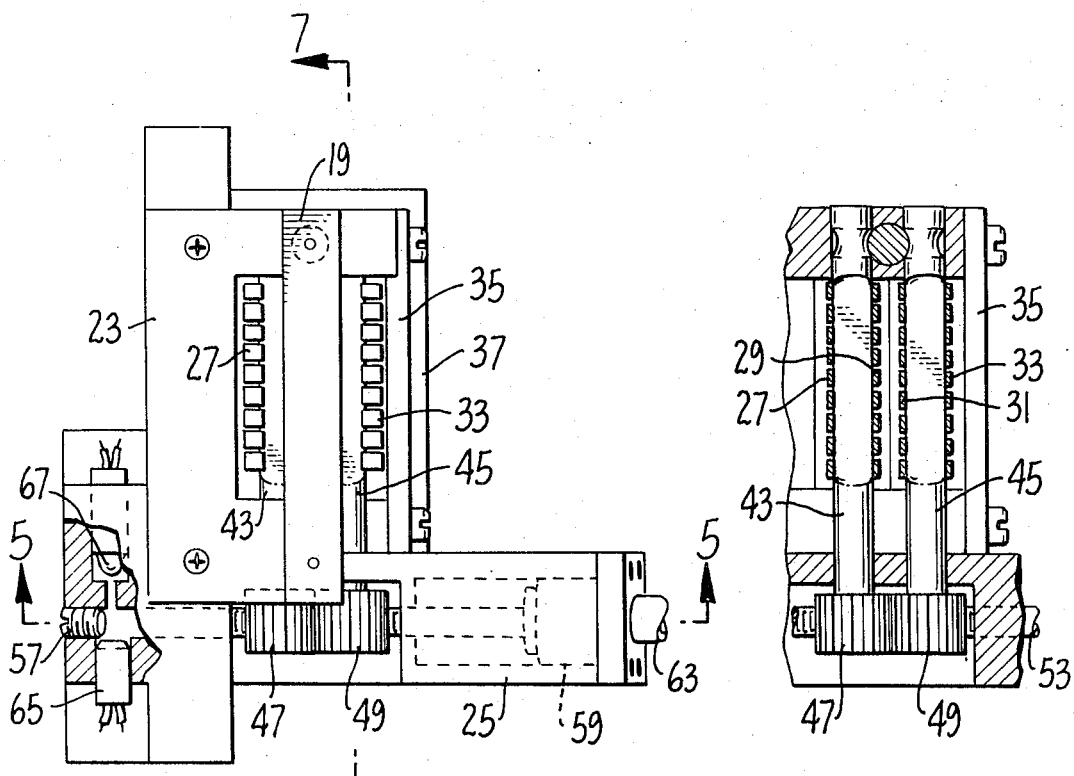
FIG. 4.
FIG. 6.
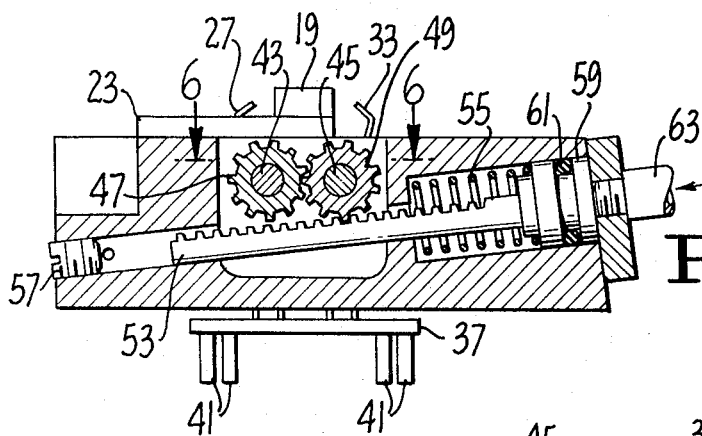
FIG. 5.
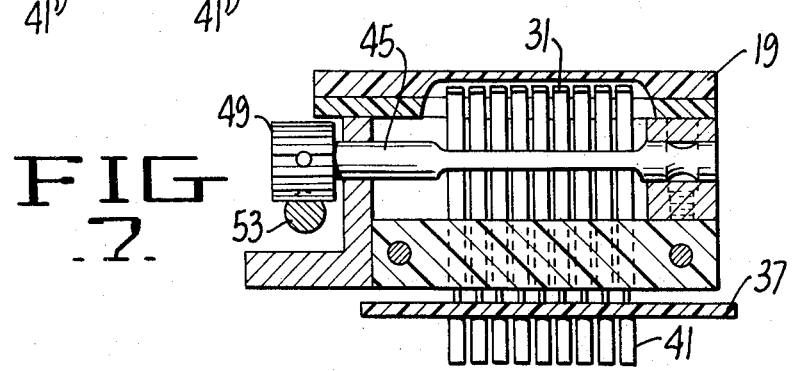
FIG. 7.

CONTACT ASSEMBLY UTILIZING FLEXIBLE CONTACTS FOR PINS OF INTEGRATED CIRCUITS

BACKGROUND OF THE INVENTION

The present invention is related generally to integrated circuit testing techniques and apparatus therefore, and more specifically is related to an improved electrical contacting technique and assembly for use in an integrated circuit tester.

Small integrated circuits for performing a number of specific functions are becoming increasingly popular. Such integrated circuits are contained in a package having a plurality of electrical leads extending therefrom. A wide variety of specific circuits are available in such packages. Most integrated circuit manufacturers test each circuit before delivery. Because of the high volume of circuits that must be tested, quick and reliable equipment is highly desirable.

It is a principal object of the present invention to provide an improved assembly for establishing electrical contact with pins of integrated circuits in a simple, quick and reliable manner in order to connect the integrated circuit with an external electronic tester.

SUMMARY OF THE INVENTION

Briefly, this and additional objects are accomplished by the present invention wherein a guide means is provided for holding integrated circuits one at a time in a testing position, flexible contacts being provided that are each fixed at one end with respect to the guide means and positioned so that a free end may be flexed against an integrated circuit pin to establish contact therewith. Each of the contacts is then flexed away from the pin after a test has been completed in order to permit the integrated circuit to be removed from the testing station and another one to be moved into testing position. The contacts are flexed, in a preferred form of the invention, by a rotating eccentric cam that is long enough to bend all of the flexible contacts simultaneously.

In a preferred form, a row of flexible contacts are provided on each side of a cam wherein one rotatable position of the cam spreads the contacts apart to permit an integrated circuit to be moved in or out of testing position, while another rotatable position of the cam permits the flexible contacts to come into electrical and mechanical contact with the integrated circuit pin during the conducting of a test thereon. Since most commercial integrated circuit packages have two parallel rows of pins, a second cam with two additional rows of flexible contacts on either side thereof are provided.

Such a structure is simpler and more reliable than existing contact assemblies where the contacts are mounted on a separate structure that is moved entirely toward and away from an integrated circuit under test. Furthermore, the electrical distance from the integrated circuit pins to the testing circuits may be maintained very short by a construction according to the present invention which thereby reduces time delay error in high frequency test readings of the integrated circuit.

Additional objects, advantages and structural features of the various aspects of the present invention are apparent from the following description of its preferred embodiments which should be taken in conjunction with the accompanying drawings.

BRIEF DESCRIPTION OF THE DRAWINGS

FIG. 4 is a top view of the embodiment of FIG. 1;

FIG. 5 is a view of FIG. 4 taken across Section 5—5 thereof;

FIG. 6 is a view of FIG. 5 taken across Section 6—6 thereof;

FIG. 7 is a view of FIG. 4 taken across Section 7—7 thereof;

DESCRIPTION OF THE PREFERRED EMBODIMENTS

Figure 1:
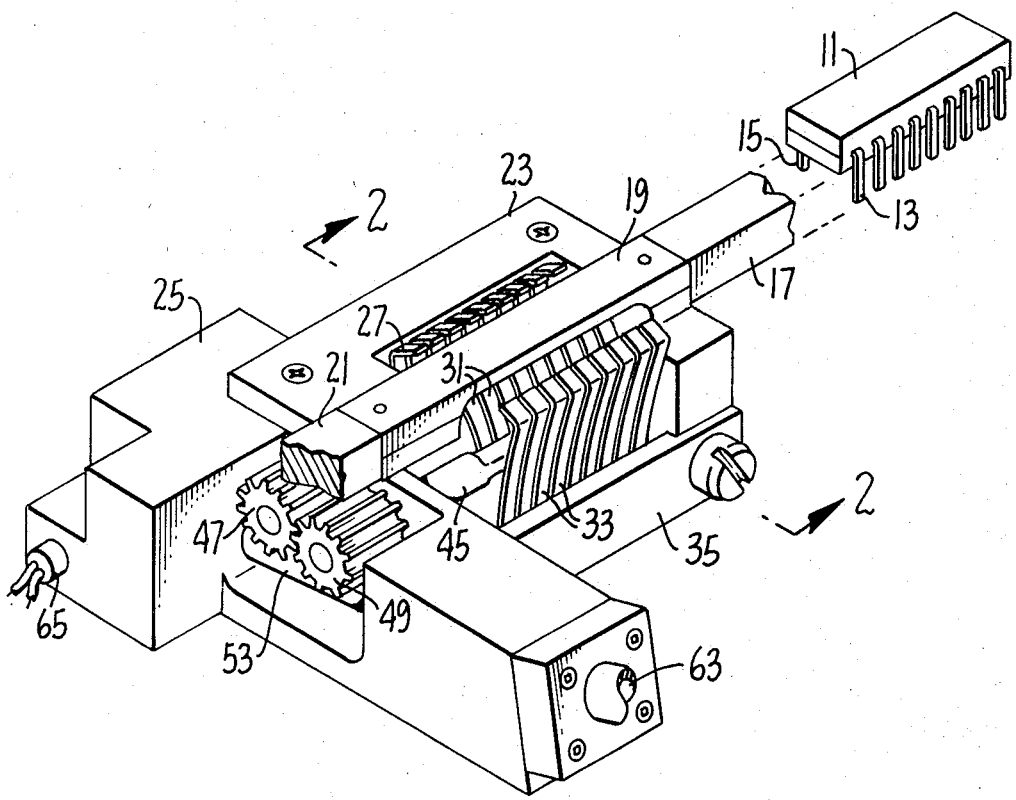
FIG. 1 is a perspective view of one specific embodiment of the present invention.

The contactor of the present invention will usually be a portion of a larger machine or process for rapidly storing and moving integrated circuits in and out of testing position one at a time. Referring to the embodiment of FIGS. 1–7, a package 11 (FIG. 1) containing an integrated circuit includes a row 13 of individual electrically conductive pins which bring the connections of the internal integrated circuit to the external world. A second row 15 of pins is provided on an opposite side of the package 11. Although there are various specific forms of integrated circuit packages, the package 11 with parallel rows 13 and 15 of pins is very common.

A track 17 provides a guide for sliding the integrated circuit package 11 onto a testing bridge or track 19. After the integrated circuit has been tested, it is moved off an opposite end of the testing track portion 19 by a track 21. The track segment 19 is supported by a plate 23 to a frame or casing 25 of the contacting assembly. The specific means of supporting the integrated circuit guiding and holding tracks is not important in the present invention and only one specific form is being illustrated herein. The guiding track and bridge may in fact be a permanent part of a larger piece of integrated circuit handling equipment while the rest of the contactor shown in FIGS. 1–7 is removably inserted therein.

The external pins of an integrated circuit package are contacted by four rows 27, 29, 31 and 33 of flexible electrically conductive contacts. Each of the four rows of contacts contains a plurality of contacts, nine contacts each in the example shown, which are spaced apart just enough to remain electrically insulated from one another. The four rows of contacts are parallel to one another and each of the contacts is rigidly held adjacent one end thereof by a portion 35 of the frame. In the embodiment shown in FIGS. 1–7, each of the cooperating rows of contacts (27, 29, and 31, 33) is positioned so that their contacts are directly opposite one another. All of the contacts extend through the holding frame portion 35 and terminate in a printed circuit board 37. As can be seen best from FIGS. 2 and 3, each pair of opposing contacts are electrically connected together by a conductive strip 39 deposited on a side of the printed circuit board 37 opposite to that side from which the rows of contacts stands. The conductive strip 39 also is electrically connected with a terminal for plug 41. Each pair of cooperating opposing contacts are so connected together and to a terminal or plug element, thereby making a total of nine terminals or plugs for the pair of contact rows 27 and 29 and another nine terminals or plugs for the pairs of contact rows 31 and 33. The circuits used for testing the integrated circuit are then plugged into these terminals or plugs directly at the printed circuit board 37.

The pairs of rows of contacts 27 and 29 are provided with an elongated cam 43 that is eccentric in cross-section and positioned between the rows. Similarly, the rows of contacts 31 and 33 are provided with a similar elongated cam 45 being eccentric in cross-section and positioned between the rows 31 and 33. The cams 43 and 45 are journaled adjacent their ends into the frame of the device. Pinion gears 47 and 49 are attached to the ends of the cams 43 and 45, respectively. The cams are rotated through the pinion gears 47 and 49.

Figure 2:
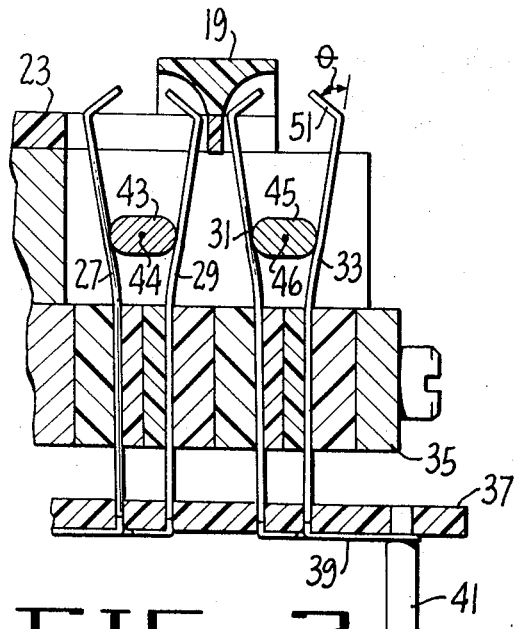
FIG. 2 is an enlarged view of a portion of FIG. 1 taken across Section 2—2.
Figure 3:
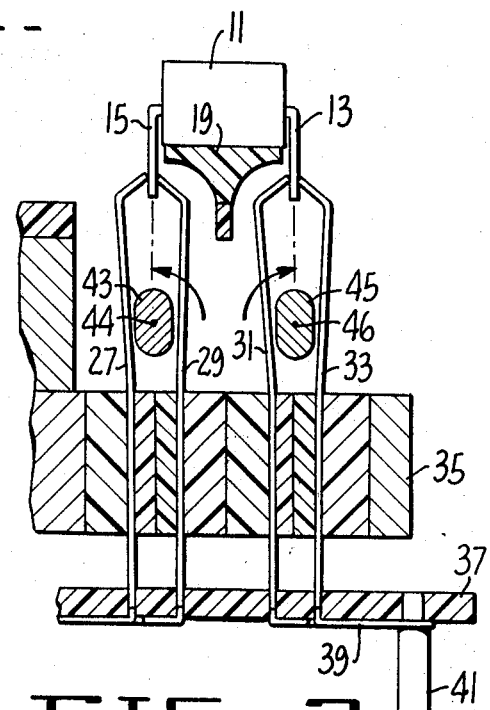
FIG. 3 is the same view of FIG. 1 as shown in FIG. 2 but with certain elements shown in a different position.

Referring primarily to FIGS. 2 and 3, the operation of the cams in deflecting the contacts is best illustrated. The cams 43 and 45 rotate about axes 44 and 46, respectively. The cross-sectional shape of each of the cams 43 and 45 includes two semicircles joined by parallel tangential lines. In the embodiment being described, the cams 43 and 45 have two operating angular positions displaced 90° from one another. In FIG. 2, the cams 43 and 45 are in one of these two extreme positions which force their respective pairs of rows of contacts apart to permit insertion or removal of an integrated circuit package. In FIG. 3, the cams 43 and 45, shown in their second operating position or in their respective rows of contacts are permitted by their natural resiliency to urge themselves against their respective pins of the integrated circuit package. Axes 44 and 46 of rotation of the cams 43 and 45, respectively, are parallel to one another and to the track 19. The axes 44 and 46 are positioned a small distance outside of a projection of the track 19 on either side thereof so as to be approximately directly under the rows of pins of the integrated circuit 11. This specific arrangement is preferred because it provides for contact of each pin by a distinct opposing pair of flexible contacts.

The width of the bridge 19 is preferably somewhat smaller than the width of the integrated circuit packages being tested, as is shown in FIG. 3. This then allows the rows of flexible contacts to center the integrated circuit being tested. By having each pin of the integrated circuit contacted on opposite sides thereof by an opposing pair of flexible contacts of the tester, the possibility that a pin bent out of line from the other pins on an integrated circuit will not be contacted by at least one of the contacts of each pair is significantly reduced. Furthermore, it will be noted from FIG. 3 that each pair of opposing contacts, such as the opposing contacts of the rows 27 and 29, may move somewhat from left to right before one of them abuts against its cam 43, thereby accommodating integrated circuit package pins at various positions.

Each of the flexible contacts of the tester is permanently bent at its free end in a direction back over its actuating cam. Referring to FIG. 2, for instance, the flexible contact indicated in row 33 as a free end 51 forms an angle $\theta$ with the major segment of the flexible contact in the row 33. The angle $\theta$ is preferably about 45° to 60°. This angled free end tip on each of the flexible contacts provides some wiping or rubbing against the integrated circuit pin as it is closed thereon when the cams 43 and 45 are rotated from the position of FIG. 2 to that of FIG. 3. This action helps clean both the contact and the integrated circuit pin in order to assure an improved electrical connection therebetween. Also, the bent end portion of the free ends of each of the flexible contacts controls the degree of flex shown in FIG. 3 when an integrated circuit package pin is gripped between opposing pairs of flexible contacts.

Referring primarily to FIG. 5, the mechanism which rotates the cam 43 and 45 will be explained. A rack 53 operably engages the pinion gear 49. The rack 53 is provided in a chamber which permits its movement from the rest position of FIg. 5 as urged by a spring 55 to a position (not shown) wherein the rack 53 buts up against an adjustable stop 57. The rack is connected at its opposite end to a piston 59 which is sealed by an O-ring 61 to a piston chamber within the case or frame 25 of the contacting unit. The piston 59 is moved against the force of the spring 55 by air pressure introduced through a hose 63. This then moves the rack 53 until its extreme end abuts against the stop 57. When air pressure is released, the spring 55 returns the rack 53 to the position shown in FIG. 5. In the rest position of FIG. 5, the contacts are in their open position as illustrated in FIG. 2. When sufficient air pressure is introduced through the hose 63, the flexible contacts are permitted to close as result of the rotation of the cams 43 and 45 to their positions shown in FIG. 3. The air pressure is held until the testing of a particular integrated circuit is completed. An air actuated system is preferred since it does not generate any electrical noise which could interfere with the testing signals. The adjustable stop 57 is adjusted so that the full travel of the rack 53 will turn each of the cams 43 and 45 an amount substantially equal to 90°.

It will be noted that the cams 43 and 45 rotate in opposite directions. This is desirable since it tends to center the integrated circuit 11 in its test position. Rotation of the cams 43 and 45 in the same direction tends to push the integrated circuit package 11 in that direction.

In order to develop a signal when the cams 43 and 45 are in the position shown in FIG. 3, a photocell 65 (FIG. 4) is positioned in the path of a light beam from a light bulb 67. As the rack 53 is driven by air pressure against the top 57, the light beam is broken and an appropriate pulse signal is then developed at the photocell 65. This signal can be used in conjunction with the tester to tell us that an integrated circuit has been contacted and is ready for a test to begin.

In a modification of the embodiment described with respect to FIGS. 1–7 that is desirable for certain applications, each of the flexible contacts of the rows 27, 29, 31 and 33 is electrically connected to its own terminal or plug on the printed circuit board 37. That is, the opposing pairs of flexible contacts are not electrically connected together as was described with respect to FIGS. 2 and 3, but rather are connected to distinct terminals or plugs such as the plugs 41. By having individual terminals, it is possible to make sure contact has been made between the flexible contacts and the integrated circuit package pins before a test is conducted. Each pin should be contacted by two opposing flexible contacts of the tester. A signal passed from one contact to the other determines whether the integrated circuit 11 is in fact electrically contacted by both contacts of a cooperating pair.

Figure 8:
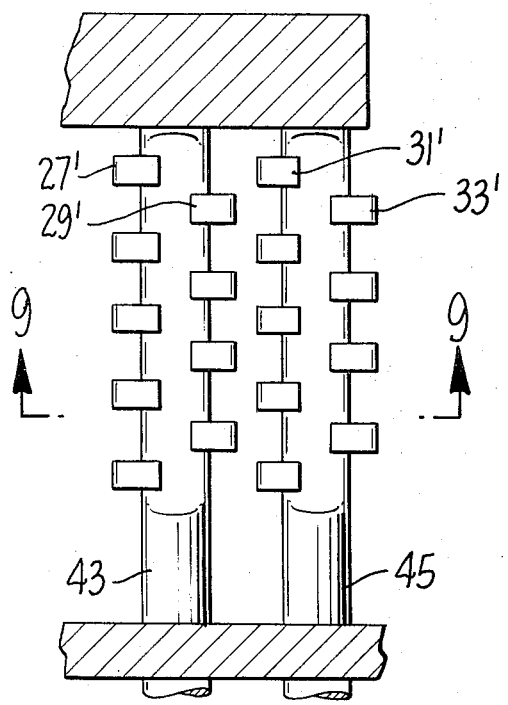
FIG. 8 shows in top view a modification of the embodiment of FIGS. 1–7.
Figure 9:
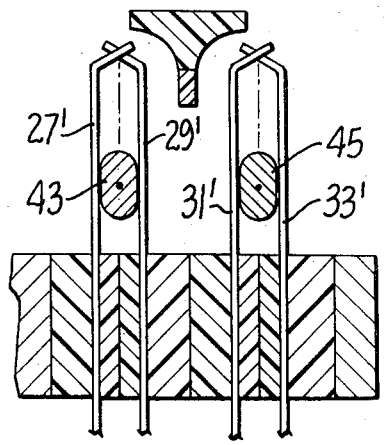
FIG. 9 is a view of the modified embodiment of FIG. 8 taken across Section 9—9 thereof with certain elements being moved somewhat.

Another variation in the embodiment of FIGS. 1–7 is illustrated with respect to FIGs. 8–9. FIG. 8 shows a top view of the cams 43 and 45 with adjacent rows 27', 29', 31' and 33' of flexible contacts. The difference in the embodiment of FIG. 8 from that of FIGS. 1–7 is that the flexible contacts in each of these four rows are spaced apart by eliminating alternate contacts. Furthermore, the opposing pairs of rows of contacts, such as the rows 27' and 29', are positioned so that a contact of one of these rows is opposite a space of the other row. Each pin of an integrated circuit package is thus contacted by one of these flexible contacts rather than by two contacts as in the embodiment of FIGS. 1–7. The embodiment of FIGS. 8 and 9 is preferably utilized for extremely high frequency testing of integrated circuits. The additional spacing between the flexible contacts reduces undesirable capacitance coupling therebetween which can be a problem in certain high frequency test applications.

FIG. 9 shows the modification of FIG. 8 when the cams 43 and 45 are rotated to a position that allows the flexible contacts to close in on integrated circuit pins. From FIG. 9 it can be seen that each of the pins in its rest position without an integrated circuit in position extends across the axis of rotation of its respective cam. Therefore, there is still a wide region in which a bent integrated circuit package pin may occupy and still be contacted by one of the flexible contacts.

The cams 43 and 45 can be made of a plastic material in order to provide insulation between the flexible contacts but it is preferred that the cams be made of metal for prolonged life of the contactor assembly. In order to prevent electrical contacts from being established through the cams between the flexible contacts, the inside surface of the contacts are coated with an insulating material such as an adhesive backed Teflon material.

With constant flexing of the flexible contacts, it is possible that the flexible contacts will malfunction prior to any other parts of the apparatus. Although it has been found that the flexible contacts can be operated for a very large number of integrated circuit tests, it is desirable to build the contactor illustrated with respect to the drawing so that the frame portion 35 which holds the flexible contacts and the printed circuit board 37 can be removed from the contactor assembly and replaced without having to replace an entire contactor assembly.

The various aspects of the invention have been described with respect to specific examples thereof but it will be understood that the invention is entitled to protection within the full scope of the appended claims.

I claim:

1. An integrated circuit test contractor, comprising:

an elongated track held fixed with respect to a frame to provide a top surface for support of integrated circuit packages to be moved therealong, first and second elongated cams being eccentric in cross-section with narrow and wide dimensions and rotatable about first and second axes that are fixed with respect to the frame and parallel to said track, said first axis being positioned on one side of the track and said second axis being positioned along an opposite side of said track, first, second, third and fourth rows of flexible electrically conductive contacts held parallel to said track by rigid attachment of one end of each contact to said frame, the other end of each contact being freely permitted to flex in a path below said support top surface, said first and second rows of contacts being on opposite sides of said first cam with their free ends extending above said first cam and normally extending inward over said first axis when said first cam is positioned with its narrow dimension between said rows, said first and second rows of contacts being flexed outward when the first cam is positioned with its wide dimension between said rows, said third and fourth rows of contacts being on opposite sides of said second cam with their free ends extending above said second cam and normally extending inward over said second axis when said second cam is positioned with its narrow dimension between said rows, said third and fourth rows of contacts being flexed outward when the second cam is positioned with its wide dimension between said rows, resilient means normally holding said cams in a position with each of the first and second cams having their wide dimension positioned between their respective rows of contacts, whereby the free ends of the contacts are normally spread apart, and means acting against said resilient means for simultaneously rotating each of said first and second cams to position their narrow dimension between their respective rows of contacts, whereby the free ends of said contacts are closed toward each other.

2. Apparatus according to claim 1 wherein each row of contacts contains spaces between contacts with each of said first and second and said third and fourth pairs of contacts are arranged with each contact free end being opposite a space of the row on the opposite side of the cam.

3. Apparatus according to claim 1 wherein said first and second rows of contacts are positioned with each contact of one row directly opposite a contact of the other row, wherein said third and fourth rows of contacts are positioned with each contact of one row directly opposite a contact of the other row, and wherein the free end of each contact is permanently bent back over said cam in contact with an opposing contact free end when their associated cam is positioned with its narrow dimension between said contacts, whereby opposing pairs of contacts are able to grip a circuit pin therebetween.

4. Apparatus according to claim 1 wherein said rotating means includes means to rotate said cams in opposite directions about their respective axes, whereby an integrated circuit package being tested will be centered on said track as it is engaged by said contacts.

5. A contact assembly for an integrated circuit package tester, comprising:

a printed circuit board, four parallel rows of flexible but normally straight electrically conductive contacts attached at one end thereof to said printed circuit board and extending from one side thereof, opposite ends of said contacts being free to move as they are deflected, said contact rows being arranged in two pairs of cooperating adjacent rows each, the free end of each of the contacts being bent toward its paired row of contacts at an acute angle with the normally straight segment of the contact from said bent portion to said printed circuit board, said segment from the bent portion to the printed circuit board of all contacts being normally parallel to one another in an undeflected position, and a plurality of plugs extending from a side of the printed circuit board opposite to that from which the flexible contacts extend, said plugs being electrically connected to said contacts by conductors formed on said opposite side of the printed circuit board.

6. The contact assembly of claim 5 wherein each pair of rows of said flexible contacts contain contacts directly opposite each other, said opposite pairs of contacts being electrically connected on said another side of the printed circuit board to a single one of said plugs.

7. The contact assembly of claim 5 wherein each pair of rows of said flexible contacts contains contacts positioned directly opposite each other, each contact of said opposing pair of each pair of rows of contacts being connected on said another side of the printed circuit board to their own distinct plugs.

8. A contact assembly for an integrated circuit package tester, comprising:

a printed circuit board, four parallel rows of flexible electrically conductive contacts attached at one end thereof to said printed circuit board and extending from one side thereof, opposite ends of said contacts being free to move as they are deflected, the free end of each of the contacts being bent at an acute angle with the segment of the contact from said bent portion to said printed circuit board, said segment from the bent portion to the printed circuit board of all contacts being normally parallel to one another in an undeflected position, each row of contacts containing spaces between contacts, and further wherein opposing pairs of rows are positioned with a contact of one row being opposite a space of the other row, each of said contacts being connected by conductors on said opposite side of the printed circuit board to its own individual distinct plug, and a plurality of plugs extending from a side of the printed circuit board opposite to that from which the flexible contacts extend, said plugs being electrically connected to said contacts by conductors formed on said opposite side of the printed circuit board.

9. Apparatus for making temporary electrical connections with an electronic component through at least one row of contact pins that extend outward from the component in a given direction, comprising:

means for holding said component with its rows of contacts along a given line, a plurality of flexible contacts that are each anchored by one end thereof into two rows a distance apart on opposite sides of said given line, each of said contacts extending with their opposite ends free to be flexed and being positioned with spaces between contacts along each row, the contacts of one row being held opposite a space of another row, said contacts additionally having their free ends normally passing through said given line in the absence of the electronic component row of contact pins being therebetween, and means positioned between the rows of contacts and intermediate of their free and anchored ends for simultaneously bending all of said contacts outward a distance away from said given line, whereby the row of contact pins of said electronic component may be inserted into or removed from the space between the free ends of the rows of contacts.

* * * * *